(12) United States Patent
Schaffner

(10) Patent No.: US 9,276,797 B2
(45) Date of Patent: Mar. 1, 2016

(54) LOW COMPLEXITY NARROWBAND INTERFERENCE SUPPRESSION

(71) Applicant: Digi International Inc., Minnetonka, MN (US)

(72) Inventor: Terry Michael Schaffner, Warrenville, IL (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 14/254,649

(22) Filed: Apr. 16, 2014

(65) Prior Publication Data

US 2015/0304150 A1 Oct. 22, 2015

(51) Int. Cl.
*H04L 27/26* (2006.01)

(52) U.S. Cl.
CPC .......... *H04L 27/2665* (2013.01); *H04L 27/265* (2013.01)

(58) Field of Classification Search
USPC .......................... 375/346, 278, 284, 348, 350
See application file for complete search history.

(56) References Cited

U.S. PATENT DOCUMENTS

| | | | |
|---|---|---|---|
| 5,612,978 A | 3/1997 | Blanchard et al. | |
| 6,868,114 B2 | 3/2005 | Bially et al. | |
| 6,975,673 B1 | 12/2005 | Rouquette | |
| 7,856,063 B2 * | 12/2010 | Coulson | 375/260 |
| 8,194,766 B2 | 6/2012 | Kun et al. | |
| 8,428,197 B2 | 4/2013 | Im et al. | |
| 8,515,335 B2 | 8/2013 | Dafesh et al. | |
| 8,626,517 B2 | 1/2014 | Bessette | |
| 2003/0179840 A1* | 9/2003 | Oh et al. | 375/350 |
| 2004/0030364 A1 | 2/2004 | Bange et al. | |
| 2012/0014416 A1* | 1/2012 | Dabiri | 375/144 |
| 2012/0306695 A1 | 12/2012 | Kim et al. | |
| 2012/0313809 A1 | 12/2012 | Testar et al. | |

FOREIGN PATENT DOCUMENTS

WO  2014019331  2/2014

OTHER PUBLICATIONS

European Patent Office, "Extended European Search Report from EP Application No. 15163745.1 mailed Sep. 17, 2015", "from Foreign Counterpart of U.S. Appl. No. 14/254,649", Sep. 17, 2015, pp. 1-7, Published in: EP.

Saarnisaari et al., "Interference Mitigation Techniques for Single and Multi Antenna Receivers", "First European Conference on Antennas and Propagation", Nov. 6-10, 2006, pp. 1-8.

* cited by examiner

*Primary Examiner* — Kabir A Timory
(74) *Attorney, Agent, or Firm* — Fogg & Powers LLC

(57) ABSTRACT

In one embodiment a method for suppressing narrowband interference in an RF signal is provided. The method includes providing a block of baseband digital samples of the RF signal and computing n-1 stages of an n stage fast Fourier transform (FFT) on the block of the baseband digital samples to produce a first block of intermediate data points. A final threshold is computed based on values of the intermediate data points. A final stage of the n stage FFT is computed from the first block of intermediate data points to produce a block of output data points, and the output data points that have an energy above the final threshold are attenuated.

19 Claims, 3 Drawing Sheets

LOW COMPLEXITY NARROWBAND INTERFERENCE SUPPRESSION

BACKGROUND

Radio Frequency (RF) interference can degrade the performance of a communication system, and, if severe, can jam the communication link altogether. Many solutions exist for suppressing such RF interference. These solutions include adaptive windowing, excision (notch) filters, and frequency domain processing.

SUMMARY

In one embodiment a method for suppressing narrowband interference in a radio frequency (RF) signal being received is provided. The method includes providing a block of baseband digital samples of the RF signal and computing n-1 stages of an n stage fast Fourier transform (FFT) on the block of the baseband digital samples to produce a first block of intermediate data points. A final threshold is computed based on values of the intermediate data points. A final stage of the n stage FFT is computed from the first block of intermediate data points to produce a block of output data points, and the output data points that have an energy above the final threshold are attenuated.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Embodiments described herein provide for an apparatus and method for suppressing narrowband interference in an RF signal being received. Such an apparatus/method can be implemented as part of a receiver receiving the RF signal. The narrowband suppression is accomplished, in part, by an excision filter having low implementation complexity. The low implementation complexity is achieved by using intermediate data points generated by a fast Fourier transform (FFT) to determine an energy threshold for the excision filter.

Figure 1:
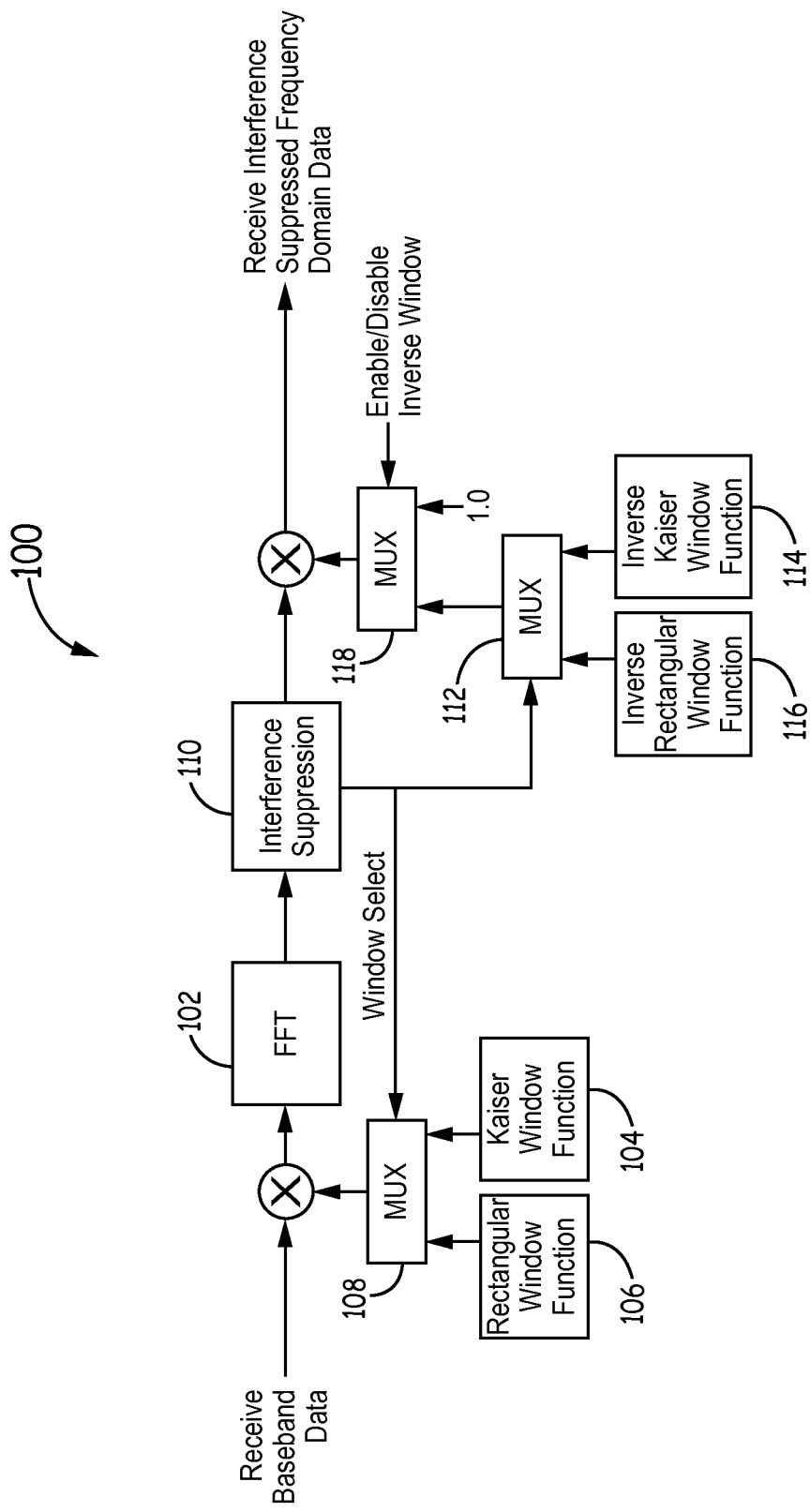
FIG. 1 is a flow diagram of an example of a method for low complexity suppression of narrowband interference.

FIG. 1 is a flow diagram 100 of an example of such a method for suppressing narrowband interference. The method operates on a stream of baseband digital samples of an RF signal being received. The stream of baseband digital samples can be obtained in any suitable manner by downconverting and sampling an RF signal.

Initially, a window function can be applied to the baseband digital samples. The window function can be used to reduce the amount of sidelobe energy in the baseband digital samples. Any suitable window function can be used including a Kaiser window and a Hamming window. In some examples no window function (equivalent to a rectangular window) is applied. The window function is multiplied by the baseband digital samples and the windowed baseband digital samples are provided to an FFT 102 for transformation into the frequency domain. The window function is applied to the baseband digital data in blocks. That is, the baseband digital data is divided by time into blocks of data and a window function is applied to each block of data. In an example, the number of samples in a block is based on the number of samples in a block operated on by the FFT 102 as discussed below.

In an example, the type of window function to apply is dynamically selected based on the amount of energy in the RF signal being received. In such an example, the window function is not undone during reception of payload data by applying an inverse window function, so applying the window function degrades the sensitivity. Therefore, the type of window function applied can be dynamically selected to be more aggressive when it is more beneficial. When the energy of the RF signal is high, either the desired signal is well above the noise floor or there is strong in-band interference. If the desired signal is well above the noise floor, the decreased sensitivity of a more aggressive window is irrelevant since the data can be more easily identified above the noise. If there is strong in-band interference, a more aggressive window can help reduce leakage and enable better narrowband noise suppression. Therefore, if the energy of the RF signal is higher, a more aggressive window function is applied. If the energy of the RF signal is lower, a less aggressive (i.e., more rectangular) window function is applied.

In any case, the energy of the RF signal is determined and the type of window function applied to the baseband digital samples is selected based on the energy. For example, the energy of the RF signal can be compared to a window energy threshold. If the energy of the RF signal is above the window energy threshold, a first window function 104 (e.g., a more aggressive window such as a Kaiser window) can be applied. If the energy of the RF signal is below the window energy threshold, a second window function 106 (e.g., a less aggressive window or no window such as a rectangular window) can be applied. In an example, the comparison of the energy in the RF signal to the window energy threshold can be used to control a first multiplexor 108 which selects which window function 104, 106 to apply. In other examples other means of selecting a window function can be used. On such other example is to select a type of window based upon the estimated amount of narrowband interference present in previously received data (e.g., block). An estimated of the narrowband interference level may be determined by computing the relative amount of energy that was suppressed, or by calculating the number of data points in the block that were excised.

As mentioned above, the window function is applied on a block-by-block basis. Accordingly, the window function can be dynamically selected for each block of baseband digital samples based on the energy level of that block of baseband digital samples. Additionally, in other examples, more than one window energy threshold can be used to select between more than two window functions. In an example, the energy of the RF signal is determined by the interference suppression process 110 as described in more detail below. In other examples, the energy of the RF signal is determined by other circuitry.

As mentioned above, the narrowband suppression occurs via an excision filter in the frequency domain. Accordingly, the baseband digital samples are transformed from the time domain to the frequency domain. This frequency domain transformation is accomplished with the FFT 102. The FFT 102 operates on blocks of data; therefore, the stream of baseband digital samples is divided into blocks of data for operation by the FFT 102. Since the FFT 102 operates on data in block manner, the data output from the FFT 102 is provided in a corresponding block manner. Accordingly, the output of the FFT 102 is a sequence of blocks of frequency domain data. Each block of frequency domain data output from the FFT 102 is the frequency domain transformation of a block of baseband digital samples. The number of baseband digital samples in each block of data corresponds to the type of FFT 102 used. Any suitable FFT 102 can be used. In an example, the FFT 102 is a 1024 point radix-2 FFT which operates on blocks of 1024 baseband digital samples. More detail regarding the FFT 102 is provided with respect to FIG. 2.

The blocks of frequency domain data are provided to the interference suppression process 110 which performs excision filtering on the frequency domain data to remove narrowband interference therein. The interference suppression process 110 operates on each block of frequency domain data individually. The output of the interference suppression process 110 is a sequence of blocks of interference suppressed frequency domain data that can be provided to a demodulator where the transmitted information data is recovered. More detail regarding the interference suppression process 110 is provided with respect to FIG. 3.

In an example, an inverse window is applied to the sequence of blocks of interference suppressed frequency domain data. The inverse window is the inverse of the window function that was applied to the baseband digital samples prior to being transformed into the frequency domain. That is, the time domain inverse of the window function that was applied to the baseband digital samples. The inverse window is applied to reverse the effects of the window function on the time domain baseband digital samples. Typically, for a time domain window function, to reverse its effects in the frequency domain would require the inverse window to be transformed to the frequency domain then convolved with the frequency domain data. Due to the unique properties of a linear chirp signal, however, the effects of the windowing can be reversed by multiplying the frequency domain data with the (time domain) inverse window. This enables an implementation with much lower complexity and latency.

In an example, therefore, the methods described herein apply a time domain inverse window when the RF signal being received includes a linear chirp. Since the inverse window is applied to a signal having a linear chirp, the time domain inverse window can be multiplied to each block of frequency domain data output from the interference suppression process 110. That is, although the window function is applied in the time domain, the time domain inverse window can be applied in the frequency domain without transforming the inverse window into the frequency domain because the RF signal includes a linear chirp. Accordingly, when the RF signal being received does not include a linear chirp the inverse window is not applied.

In order to undo the effects of the window function applied to the baseband digital samples, the inverse window is the inverse of the same type of window that was applied to the baseband digital samples. Accordingly, in examples where the window function is dynamically selected, the inverse window function is also dynamically selected to be the inverse of the window function that was selected for the baseband digital data. Moreover, since the window function is applied on a block-by-block basis, the inverse window function is applied in a corresponding block-by-block basis. That is, for a given block of frequency domain data output from the interference suppression process 110, the inverse window applied is selected to be the inverse of the type of window function that was applied to the block of time domain baseband digital data that was transformed into the frequency domain to produce that block of frequency domain data. In an example, a second multiplexor 112 is used to select between an inverse of the first window function 114 and an inverse of the second window function 116. Moreover, in some examples, the selection of which inverse window function can be implemented in the same manner as the selection of the (non-inverse) window function. For example, the selection of which inverse window function to use can be based on one (or more) window energy thresholds as discussed above. In other examples other means of selecting an inverse window function can be used.

In some examples, the RF signal being received includes a linear chirp during some periods and does not include a linear chirp during other periods. Accordingly, in an example, the inverse window can be selectively applied to each block of frequency domain data based on whether the block of frequency domain data corresponds to a block of baseband digital data including a linear chirp. Before applying the inverse window function on a block of frequency domain data, therefore, it is determined whether the corresponding block of baseband digital data included a linear chirp. In an example, this determination is made based on a priori knowledge of the RF signal being received. For example, the RF signal received may include defined portions, such as a preamble portion and a payload portion. The preamble portion may include a linear chirp, while the payload portion may not. Thus, the determination of whether a given block of baseband digital data includes a linear chirp can be made by identifying whether the block of baseband digital data corresponds to a preamble portion or a payload portion. Methods for making such a determination are well known to those skilled in the art. Once the determination has been made, an inverse window is selected and applied if the corresponding block of baseband digital data did include a linear chirp and an inverse window is not applied if the corresponding block of baseband digital data did not include a linear chirp. In an example, a third multiplexor 118 is used to select whether an inverse window function or all unity is multiplied with the block of frequency domain data. In other examples other means of selecting whether an inverse window function is applied can be used.

Figure 2:
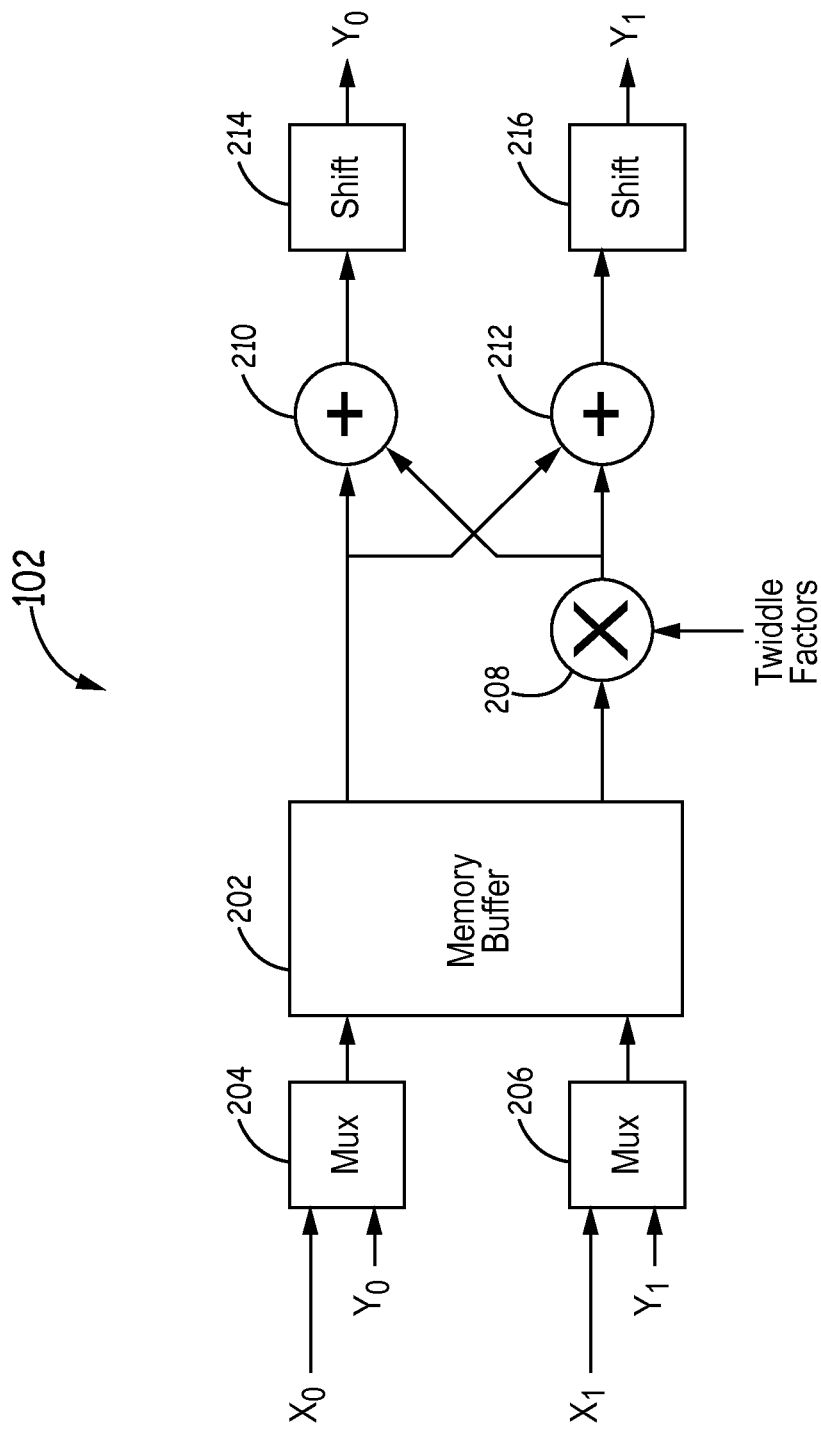
FIG. 2 is a flow diagram of an example fast Fourier transform (FFT) for use in the method of FIG. 1.

FIG. 2 is a flow diagram of an example FFT 102. This example is a radix-2 FFT; however, other radix FFTs can also be used. As a radix-2 FFT, the FFT operates on two data points at the same time as shown in FIG. 2 ($X_0$, $X_1$). Thus, in this example, two data points are input and two corresponding data points are output ($Y_0$, $Y_1$). This process is repeated until all data points of a block of data (e.g., block of baseband digital samples) have been operated on. Processing all the data points in a block through the flow diagram shown in FIG. 2 is referred to as a stage of operation of the FFT. Since the data points are operated on in pairs, the flow diagram shown in FIG. 2 is repeated k/2 times, where k is the number of data points in the block, for a given stage. The outputs (pairs) from the flow diagram shown in FIG. 2 are stored in a memory buffer 202 until all data points for the block have been processed. Once all the data points have been processed (and the stage is complete), the outputs from the previous stage are retrieved from the memory buffer 202 and input back through the flow diagram shown in FIG. 2 (again in pairs).

This stage process is repeated recursively a number of times based on how large of an FFT is used. For example, for a 1024 point FFT, the stage is repeated 10 times; for a 512 point FFT, the stage is repeated 9 times. The first stage operates on the input block of baseband digital data ($X_0$-$X_k$, where k is the number of data points in the block) to generate a first block of intermediate data points ($Y_0$-$Y_k$). The first block of intermediate data points is then input back into the flow diagram of FIG. 2 as described above as the second stage of the FFT. The output of the second stage of the FFT is a second block of intermediate data points. The second block of intermediate data point is again input into the flow diagram of FIG. 2 as the third stage of the FFT. This process is repeated a number of times equal to the number of stages in the FFT. Thus, for a 1024 point FFT, the stage process is repeated recursively 10 times to transform a block of baseband digital data into a block of frequency domain data. As used herein, FFTs are referred to by the number of stages of operation used to produce the output block of frequency domain data. Thus, for example, a 1024 point FFT can be referred to as a 10 stage FFT and a 512 point FFT can be referred to as a 9 stage FFT. This can be expanded to generically describe an n-stage FFT, where n represents the number of stages and can be translated to the number of points of the FFT by taking 2 to the n power. Accordingly, the stages for a given FFT can be referred to as the first stage, the second stage . . . to the n stage, and the last four stages can be referred to as n-3 stage, the n-2 stage, and the n-1 stage, and the final stage (n stage).

The outputs from each stage of the FFT can be stored in the memory buffer 202 for use by the next stage. In an example, a first and second multiplexors 204, 206 can be used to select baseband digital data ($X_0$-$X_k$) as the input data for the first stage and intermediate data points ($Y_0$-$Y_k$) as the input data (that is stored in the memory buffer 202) for subsequent stages. Each pair of data points are then operated on by multiplying (block 208) one point by a twiddle factor, adding (210, 212) the points together and then shifting (214, 216) the points. Any appropriate twiddle factor and shift can be applied as known to those skilled in the art. The result is an output pair of data points ($Y_0$, $Y_1$). For all stages except the final stage, the output pair of data points is stored in the memory buffer 202 for use by the next stage.

Figure 3:
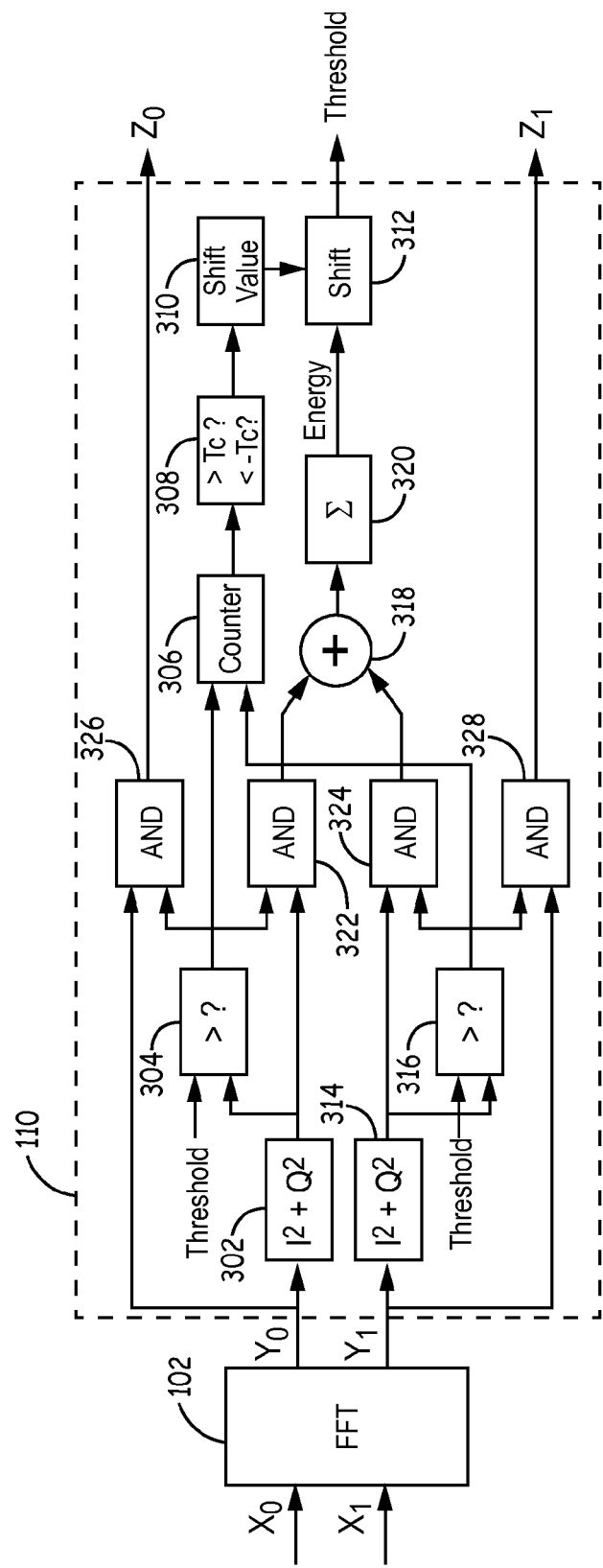
FIG. 3 is a flow diagram of an example FFT and interference suppression process for use in the method of FIG. 1.

FIG. 3 is a flow diagram illustrating the FFT 102 and showing an example detailed implementation of the interference suppression process 110. As mentioned above, the interference suppression process 110 implements an excision (notch) filter in the frequency domain to suppress narrowband interference in the RF signal being received. The energy of the frequency domain data output from the FFT 102 having a wideband signal (e.g., a DSSS signal) is relatively flat, but the energy of the undesired narrowband interference spikes at its occupied frequency bin. The excision filter exploits this fact by using an energy threshold to differentiate the narrowband interference from the desired wideband signal. In particular, the excision filter attenuates frequency domain data with an energy above the energy threshold.

To do this, the interference suppression process 110 compares the energy of each of the output frequency domain data points of the FFT 102 to a threshold. If the energy level of an output data point is above the threshold, the output data point is attenuated. If the energy level of the output data point is below the threshold, the output data point is passed through without being attenuated. In an example, a data point is attenuated by setting the data point to zero. In another example, a data point is attenuated by multiplying the data point by a factor to reduce its value.

The threshold is set at a level such that data points above the threshold are likely to comprise primarily noise and, as such, are attenuated to reduce the effects of the noise. The threshold is set dynamically for each block of frequency domain data in order to adjust for variations in signal strength. The threshold is set higher for a block of data having a higher median energy level and is set lower for a block of data having a lower median energy level. Accordingly, the energy level for a block of frequency domain data is determined and the threshold is set based thereon.

A common conventional method of determining this threshold is to compute the median energy of the block of frequency domain data output from the final stage of the FFT. Such a median operation, however, uses a considerable amount of computation, memory, and time. In contrast, the method of setting the threshold described herein can use little computation and memory, and has a low additional latency on the receive operation. The method of setting the threshold described herein operates on intermediate data points to determine the threshold for the excision filter that is applied to the block of frequency domain data that is output from the final stage of the FFT 102.

To determine the threshold, some or all of the intermediate data points output from the FFT 102 are provided to the interference suppression process 110. In an example, the threshold (also referred to herein as the final threshold) is set based on a comparison between the energy of the intermediate data points output from the n-1 stage of the FFT and a temporary threshold. In particular, the energy of each of the intermediate data points output from the n-1 stage of the FFT is compared to the temporary threshold and the final threshold is set based on how many of the intermediate data points have an energy above the temporary threshold and how many of the intermediate data points have an energy below the temporary threshold. The comparison between the energy of the intermediate data points and the temporary threshold acts as an approximation of a median for the block of data points. In this way, the results of the comparison of all the data points in the block can be used to set the final threshold. By using the intermediate data points from the n-1 stage of the FFT, the final threshold can be computed while the FFT is operating, thus reducing the latency of the filtering operation because it does not have to wait until the data is output from the final stage to determine the threshold.

In an example, the threshold is determined based on the comparison of the energy of each intermediate data point and the temporary threshold in the following manner. In an example, prior to operation of the n-1 stage of the FFT, a temporary threshold is set near an estimated median energy level of intermediate data points from the n-1 stage of the FFT. The temporary threshold is then refined during operation of the n-1 stage of the FFT, by comparing the energy of each of the intermediate data points output from the n-1 stage of the FFT to the temporary threshold, and adjusting the temporary threshold up and/or down based on the number of intermediate data points that are above and the number of intermediate data points that are below the temporary threshold. For example, if a considerably larger number of intermediate data points have an energy above verses below the temporary threshold, the temporary threshold is adjusted upward in an attempt to more accurately reflect the median energy level of the intermediate data points. Conversely, if a considerably larger number of intermediate data points have an energy below verses above the temporary threshold, the temporary threshold is adjusted down. If about an equal number of intermediate data points have an energy above the temporary threshold as have an energy below the temporary threshold, the temporary threshold is held at its current level.

The flow diagram shown in FIG. 3 is an example of a process for refining the temporary threshold based on the comparison of the energy of each intermediate data point and the temporary threshold. As shown, the intermediate data points ($Y_0$-$Y_k$) are output from the n-1 stage of the FFT 102.

The intermediate data points are output in pairs as discussed above with respect to FIG. 2. Each intermediate data point output from the n-1 stage goes through the following process to refine the temporary threshold. An intermediate data point output from the FFT ($Y_0$ for example) has its energy computed by squaring the in-phase (I) and quadrature (Q) components and adding the squared results together (block 302). This energy is compared to the temporary threshold (block 304). The result of the comparison is provided to a counter (block 306). The counter maintains a count which is incremented if the intermediate data point has an energy above the temporary threshold and is decremented if the intermediate data point has an energy below the temporary threshold. If the energy of the data point is equal to the temporary threshold, the count can be held. In an example, an intermediate data point having an energy above the temporary threshold is given equal weight to an intermediate data point having an energy below the temporary threshold by, for example, incrementing the counter by 1 and decrementing the counter by 1 respectively. In other examples, unequal weights can be given to intermediate data point having an energy above the temporary threshold as compared to an intermediate data point having an energy below the temporary threshold by setting the value incremented and decremented accordingly.

After each update of the count, it is determined whether the count reached a positive limit or a negative limit (block 308). If the count reaches the positive limit the temporary threshold is increased (block 312) by a step value (block 310) and the count is reset to zero. If the count reaches the negative limit, the temporary threshold is decreased (block 312) by the step value (block 310) and the count is reset to zero. If the count is between the positive limit and the negative limit, the temporary threshold and the count are held at their current values. In an example, an intermediate data point having an energy above the temporary threshold is given equal weight to an intermediate data point having an energy below the temporary threshold by, for example, setting the negative limit to be equal in magnitude, but opposite in sign to the positive limit. In other examples, unequal weights can be given to intermediate data point having an energy above the temporary threshold as compared to an intermediate data point having an energy below the temporary threshold by setting the positive and negative limits accordingly.

This process is repeated for each intermediate data point output from the n-1 stage of the FFT 102 to refine the temporary threshold to a value that approximates a median energy of the intermediate data points. Since two intermediate data points are output at a time ($Y_0$, $Y_1$), the process described for one intermediate data point occurs concurrently for two intermediate data points as shown by blocks 314 and 316 in addition to blocks 302 and 304.

After the energy of all the intermediate data points from the n-1 stage have been compared to the temporary threshold and the count and temporary threshold have been updated accordingly, the refined temporary threshold, which is an approximation of the median energy of the intermediate data points, can be used to set the final threshold. Since FFT has an inherent processing gain in the energy level of the data points for each stage, the temporary threshold is increased by a stage gain value to account for the processing gain between the n-1 stage and the final (n) stage. That is, since the temporary threshold is an approximation of the median energy of the n-1 stage and the final threshold is used for the output data points from the final stage, a stage gain value is added to the temporary threshold. In an example, the processing gain of each stage of the FFT is 3 dB, and the stage gain value corresponds to this 3 dB gain. In addition to the stage gain value, the final threshold can be increased by margin value to provide some margin when excising the output data points from the final stage and to account for the peak to average power ratio of the desired signal. As should be understood, in some examples, the temporary threshold can be increased only a single time to account for both the stage gain value and the margin value by using a margin value that incorporates a stage gain value. In an example, such a margin value corresponds to a 12 dB gain.

Advantageously, the process of refining the temporary threshold discussed above can be performed concurrently with operation of the n-1 stage of the FFT 102. In particular, as an intermediate data point is output from the FFT 102, the intermediate data point can be compared and used to update the count and temporary threshold immediately. This enables the refining the temporary threshold to be performed in parallel with the FFT 102 such that the final threshold is ready for use at the start of the final stage of the FFT 102 with very little additional latency (e.g., only a couple clock cycles) added to the time used to compute the FFT 102. Moreover, this process requires very little memory and additional processing power. Additionally, the sequence of intermediate data points output from a given stage of the FFT can be bit reversed such that consecutive frequency bins are interspersed. This interspersing of the frequency bins can reduce the thrashing of the count when interference is present in the RF signal.

In some examples, refinement of the temporary threshold can be performed over more than one stage. For example, instead of just refining the temporary threshold during the n-1 stage of the FFT, the temporary threshold can be refined throughout the n-2 stage and then further refined by the n-1 stage. This can be extended to three stages by initially refining the temporary threshold during the n-3 stage, further refining the temporary threshold during the n-2 stage, and refining the temporary threshold further yet during the n-1 stage. In such an example, each stage in which the temporary threshold is refined can be performed as described above with respect to FIG. 3, except using the intermediate data points from that stage instead of the n-1 stage. For example, to refine the temporary threshold during the n-3 stage, an energy of each intermediate data point from the n-3 is compared to a temporary threshold which is initially set based on an estimated median energy level for the intermediate data points of the n-3 stage. A count can be maintained as described above by incrementing the count for each intermediate data point having an energy above the temporary threshold and decrementing the count for each intermediate data point having an energy below the temporary threshold. The temporary threshold can then be increased or decreased when the count reaches the positive limit and negative limit respectively. After the energy of all the intermediate data points from the n-3 stage have been compared and the count and temporary threshold have been updated accordingly, the temporary threshold can be increased by the stage gain value to provide a temporary threshold for the next stage (the n-2 stage) of the FFT. Notably, this temporary threshold refined from the n-3 stage and increased with the stage gain value can be used as the initial temporary threshold for the n-2 stage as this refined and increased temporary threshold approximates the median energy of the intermediate data points of the n-2 stage.

The temporary threshold can then be refined through the n-2 stage in the same manner, and increased again by the stage gain value to provide the initial temporary threshold for the n-1 stage, which is further refined as described above to produce (set) the final threshold. In this way, the final threshold can be set by refining a temporary threshold over one or more intermediate stages of the FFT.

To begin the process described above an estimated temporary threshold is used. That is, if there is no refinement of a temporary threshold during a previous stage, an initial temporary threshold must be provided in some other manner. As mentioned above, such an initial temporary threshold can be set based on an estimate of the median energy of the intermediate data points. In an example, this estimate can be obtained by summing the energy of all the baseband data points in a block and then adjusting the resulting summed value to account for the number of stages of gain in the FFT (corresponding to the stage in which the initial temporary threshold will be used) and for any scaling that takes place. For example, to set an initial temporary threshold for the refinement by the n-3 stage, the energy of all the baseband digital samples can be adjusted to account for the gain of the first n-4 stages and for any scaling that takes place. This initial temporary threshold can then be refined by the n-3, n-2, and n-1 stages as discussed above to produce (set) the final threshold.

Referring back to the flow diagram of FIG. 3, some of the same components/modules used to refine the temporary threshold can also be used to set the initial temporary threshold for efficiency of components/modules. For example, to the energy of all the baseband digital samples can be computed by passing each baseband digital sample (e.g., in pairs) through the FFT without being operated on (i.e., no FFT operations) to the interference suppression process 110. The energy of each baseband digital sample can then be computed (blocks 302, 314), the energy from each sample in a pair can be summed (block 318) and the energy of all the samples in the block can be accumulated (block 320). This accumulation can then be adjusted (block 312) to account for the number of stages of gain in the FFT and for any scaling that takes place as discussed above. The threshold can be set to zero during this operation so the AND gates 322 and 324 pass all digital samples to the summation and accumulation blocks 318, 320.

Moreover, some of the same components/modules used for the interference suppression process 110 can be used to perform the excision filter operation. For example, the frequency domain data points output from the final stage of the FFT 102 (e.g., in pairs) can be compared to the final threshold (blocks 304, 316), and set to zero by an AND operation (blocks 326, 328) if the frequency domain data point is above the final threshold. In examples where a frequency domain data point is attenuated by multiplying that data point by a factor to reduce its value, the AND operation (blocks 326, 328) can be replaced by appropriate circuitry/modules to perform such a multiplication.

Finally, some of the same components/modules used for the interference suppression process 110 can be used to estimate the amount of interference present in the receive signal. During the final stage while the final threshold is used to identify which frequency domain data points to attenuate, the AND gates only pass the non-excised energy to be summed and accumulated (318, 320). The resulting value, therefore, corresponds to the portion of the RF signal that is not interference. This portion can be compared to the total power calculated with the digital samples previously to estimate a signal to interference ratio for that block of data. This signal to interference ratio, in some examples, can be used to select the type of window and inverse window applied to subsequent block(s) (e.g., the next block) as described with respect to blocks 108, 106, 104, 112, 116, and 114 above.

The flow diagrams of FIGS. 1, 2, and 3, and related processes described herein can be implemented in any appropriate hardware, software, or a combination of hardware and software. In an example, the flow diagrams of FIGS. 1, 2, and 3, and related processes are implemented on one or more processing devices that are configured to implement the acts described above on a stream of baseband digital samples. The one or more processing devices are configured to implement the above acts by being coupled to one or more data storage devices including instructions which, when executed by the one or more processing devices, cause the one or more processing devices to implement the acts.

In certain examples, the one or more processing devices can include a central processing unit (CPU), microcontroller, microprocessor (e.g., a digital signal processor (DSP)), field programmable gate array (FPGA), application specific integrated circuit (ASIC), or other processing device. In certain examples, the one or more data storage devices include a non-volatile electronic hardware device for storing machine readable data and instructions. In one example, the one or more data storage devices store information on any appropriate computer readable medium used for storage of computer readable instructions or data structures. For example, the one or more data storage devices can include configuration instructions for programming an FPGA into an appropriate configuration to implement the desired acts. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

Example Embodiments

Example 1 includes a method for suppressing narrowband interference in a radio frequency (RF) signal being received, the method comprising: providing a block of baseband digital samples of the RF signal; computing n-1 stages of an n stage fast Fourier transform (FFT) on the block of the baseband digital samples to produce a first block of intermediate data points; computing a final threshold based on values of the intermediate data points; computing a final stage of the n stage FFT from the first block of intermediate data points to produce a block of output data points; and attenuating the output data points that have an energy above the final threshold.

Example 2 includes the method of Example 1, wherein computing a final threshold includes: comparing an energy of the intermediate data points to a temporary threshold; setting a final threshold based on how many of the intermediate data points have an energy above the temporary threshold and how many of the intermediate data points have an energy below the temporary threshold; Example 3 includes the method of Example 2, wherein setting the final threshold includes: increasing the temporary threshold based on more intermediate data points having an energy above the temporary threshold than below the temporary threshold; and decreasing the temporary threshold based on more intermediate data points having an energy below the temporary threshold than above the temporary threshold; holding the temporary threshold based on a number of intermediate data points having an energy the temporary threshold being about the same as a number of intermediate data points having an energy below the temporary threshold; and after increasing, decreasing, or maintaining the temporary threshold, increasing the temporary threshold by a margin value and setting the final threshold equal to the temporary threshold.

Example 4 includes the method of any of Examples 2-3, wherein setting the final threshold includes: while computing the n-1 stage and prior to computing the final stage of the n stage FFT: incrementing a count for each intermediate data point of the first block having an energy above the temporary threshold; decrementing the count for each intermediate data point of the first block having an energy below the temporary threshold; if the count reaches a positive limit, increasing the temporary threshold by a step value and resetting the count to zero; if the count reaches a negative limit, decreasing the temporary threshold by the step value and resetting the count to zero; and after the energy of all the intermediate data points of the first block has been compared and the count and temporary threshold have been updated accordingly, increasing the temporary threshold by a margin value and setting the final threshold equal to the temporary threshold.

Example 5 includes the method of Example 4, comprising: while computing the n-3 stage and prior to computing the n-2 stage of the n stage FFT, wherein the n-3 stage produces a third block of intermediate data points from which the n-2 stage is computed: incrementing a third count for each intermediate data point of the third block having an energy above a third temporary threshold; decrementing the third count for each intermediate data point of the third block having an energy below the third temporary threshold; if the third count reaches the positive limit, increasing the third temporary threshold by the step value and resetting the third count to zero; if the third count reaches the negative limit, decreasing the third temporary threshold by the step value and resetting the third count to zero; and after the energy of all the intermediate data points of the third block has been compared and the third count has been updated accordingly, increasing the third temporary threshold by a stage gain value and setting a second temporary threshold equal to the third temporary threshold; and while computing the n-2 stage and prior to computing the n-1 stage of the n stage FFT, wherein the n-2 stage produces a second block of intermediate data points from which the n-1 stage is computed: incrementing a second count for each intermediate data point of the second block having an energy above the second temporary threshold; decrementing the second count for each intermediate data point of the second block having an energy below the second temporary threshold; if the second count reaches the positive limit, increasing the second temporary threshold by the step value and resetting the second count to zero; if the second count reaches the negative limit, decreasing the second temporary threshold by the step value and resetting the second count to zero; and after the energy of all the intermediate data points of the second block has been compared and the second count has been updated accordingly, increasing the second temporary threshold by the stage gain value and setting the temporary threshold equal to the second temporary threshold.

Example 6 includes the method of Example 5, wherein the third temporary threshold is set based on the energy of the baseband digital samples.

Example 7 includes the method of Example 6, wherein the stage gain value corresponds to the gain of the FFT for each stage.

Example 8 includes the method of any of Examples 1-7, wherein the block of baseband digital samples includes 1024 samples, the n stage FFT is a 10 stage FFT, the stage gain value corresponds to 3 dB, and the margin value corresponds to 12 dB.

Example 9 includes the method of any of Examples 1-8, wherein attenuating the output data points includes setting each output data point having an energy above the final threshold equal to zero.

Example 10 includes the method of any of Examples 1-9, wherein output data points having an energy below the final threshold are passed through without being attenuated.

Example 11 includes the method of any of Examples 1-10, repeating the computing n-1 stages, computing a final threshold, computing a final stage, and attenuating acts for successive blocks of baseband digital samples to produce a sequence of blocks of interference suppressed frequency domain samples, wherein the final threshold for each block of baseband digital samples is set based on the energy of that block of baseband digital samples.

Example 12 includes a filter for suppressing narrowband interference in a radio frequency (RF) signal being received, the filter comprising: one or more processing devices; and one or more data storage devices including instructions which, when executed by the one or more processing devices, cause the one or more processing devices to: provide a stream of baseband digital samples of the RF signal; compute n-1 stages of an n stage fast Fourier transform (FFT) on a block of the baseband digital samples to produce a first block of intermediate data points; compute a final threshold based on values of the intermediate data points; compute a final stage of the n stage FFT from the first block of intermediate data points to produce a block of output data points; and attenuate the output data points that have an energy above the final threshold.

Example 13 includes the filter of Example 12, wherein compute a final threshold includes: compare an energy of the intermediate data points to a temporary threshold; set a final threshold based on how many of the intermediate data points have an energy above the temporary threshold and how many of the intermediate data points have an energy below the temporary threshold; Example 14 includes the filter of Example 13, wherein set the final threshold includes: increase the temporary threshold based on more intermediate data points having an energy above the temporary threshold than below the temporary threshold; and decrease the temporary threshold based on more intermediate data points having an energy below the temporary threshold than above the temporary threshold; hold the temporary threshold based on a number of intermediate data points having an energy above the temporary threshold being about the same as a number of intermediate data points having an energy below the temporary threshold; and after increasing, decreasing, or maintaining the temporary threshold, increase the temporary threshold by a margin value and set the final threshold equal to the temporary threshold.

Example 15 includes the filter of any of Examples 13-14, wherein set the final threshold includes: while computing the n-1 stage and prior to computing the final stage of the n stage FFT: increment a count for each intermediate data point of the first block having an energy above the temporary threshold; decrement the count for each intermediate data point of the first block having an energy below the temporary threshold; if the count reaches a positive limit, increase the temporary threshold by a step value and resetting the count to zero; if the count reaches a negative limit, decrease the temporary threshold by the step value and resetting the count to zero; and after the energy of all the intermediate data points of the first block has been compared and the count has been updated accordingly, increase the temporary threshold by a margin value and set the final threshold equal to the temporary threshold.

Example 16 includes the filter of Example 15, wherein the instructions cause the one or more processing devices to: while computing the n-3 stage and prior to computing the n-2 stage of the n stage FFT, wherein the n-3 stage produces a third block of intermediate data points from which the n-2 stage is computed: increment a third count for each intermediate data point of the third block having an energy above a third temporary threshold; decrement the third count for each intermediate data point of the third block having an energy below the third temporary threshold; if the third count reaches the positive limit, increase the third temporary threshold by the step value and resetting the third count to zero; if the third count reaches the negative limit, decrease the third temporary threshold by the step value and resetting the third count to zero; and after the energy of all the intermediate data points of the third block has been compared and the third count has been updated accordingly, increase the third temporary threshold by a stage gain value and set a second temporary threshold equal to the third temporary threshold; and while computing the n-2 stage and prior to computing the n-1 stage of the n stage FFT, wherein the n-2 stage produces a second block of intermediate data points from which the n-1 stage is computed: increment a second count for each intermediate data point of the second block having an energy above the second temporary threshold; decrement the second count for each intermediate data point of the second block having an energy below the second temporary threshold; if the second count reaches the positive limit, increase the second temporary threshold by the step value and resetting the second count to zero; if the second count reaches the negative limit, decrease the second temporary threshold by the step value and resetting the second count to zero; and after the energy of all the intermediate data points of the second block has been compared and the second count has been updated accordingly, increase the second temporary threshold by the stage gain value and set the temporary threshold equal to the second temporary threshold.

Example 17 includes the filter of Example 16, wherein the third temporary threshold is set based on the energy of the baseband digital samples, wherein the stage gain value corresponds to the gain of the FFT for each stage.

Example 18 includes the filter of any of Examples 12-17, wherein the instructions cause the one or more processing devices to repeat the compute n-1 stages, compute a final threshold, compute a final stage, and attenuate acts for successive blocks of baseband digital samples to produce a sequence of blocks of interference suppressed frequency domain data, wherein the final threshold for each block of baseband digital samples is set based on the energy of that block of baseband digital samples.

Example 19 includes the filter of any of Examples 12-18, wherein the one or more processing devices include a field programmable gate array (FPGA), and wherein the instructions include configuration instructions for programming the FPGA into an appropriate configuration.

Example 20 includes a method for compensating for application of a window function on a block of baseband digital samples of an RF signal, the method comprising: multiplying the block of baseband digital samples by a window function; transforming the block of baseband digital samples into frequency domain data; determining if the block of baseband digital samples includes a linear chirp; and if the block of baseband digital samples includes a linear chirp, multiplying the frequency domain data by an inverse of the window function.

What is claimed is:

1. A method for suppressing narrowband interference in a radio frequency (RF) signal being received, the method comprising:
    providing a block of baseband digital samples of the RF signal;
    computing n-1 stages of an n stage fast Fourier transform (FFT) on the block of the baseband digital samples to produce a first block of intermediate data points, wherein n is an integer greater than 1;
    computing a final threshold based on values of the intermediate data points;
    computing a final stage of the n stage FFT from the first block of intermediate data points to produce a block of output data points; and
    attenuating the output data points that have an energy above the final threshold.

2. The method of claim 1, wherein computing a final threshold includes:
    comparing an energy of the intermediate data points to a temporary threshold;
    setting a final threshold based on how many of the intermediate data points have an energy above the temporary threshold and how many of the intermediate data points have an energy below the temporary threshold.

3. The method of claim 2, wherein setting the final threshold includes:
    increasing the temporary threshold based on more intermediate data points having an energy above the temporary threshold than below the temporary threshold; and
    decreasing the temporary threshold based on more intermediate data points having an energy below the temporary threshold than above the temporary threshold;
    holding the temporary threshold based on a number of intermediate data points having an energy above the temporary threshold being about the same as a number of intermediate data points having an energy below the temporary threshold; and
    after increasing, decreasing, or maintaining the temporary threshold, increasing the temporary threshold by a margin value and setting the final threshold equal to the temporary threshold.

4. The method of claim 2, wherein setting the final threshold includes:
    while computing the n-1 stage and prior to computing the final stage of the n stage FFT:
        incrementing a count for each intermediate data point of the first block having an energy above the temporary threshold;
        decrementing the count for each intermediate data point of the first block having an energy below the temporary threshold;
        if the count reaches a positive limit, increasing the temporary threshold by a step value and resetting the count to zero;
        if the count reaches a negative limit, decreasing the temporary threshold by the step value and resetting the count to zero; and
        after the energy of all the intermediate data points of the first block has been compared and the count and temporary threshold have been updated accordingly, increasing the temporary threshold by a margin value and setting the final threshold equal to the temporary threshold.

5. The method of claim 4, comprising:
while computing the n-3 stage and prior to computing the n-2 stage of the n stage FFT, wherein the n-3 stage produces a third block of intermediate data points from which the n-2 stage is computed:
incrementing a third count for each intermediate data point of the third block having an energy above a third temporary threshold;
decrementing the third count for each intermediate data point of the third block having an energy below the third temporary threshold;
if the third count reaches the positive limit, increasing the third temporary threshold by the step value and resetting the third count to zero;
if the third count reaches the negative limit, decreasing the third temporary threshold by the step value and resetting the third count to zero; and
after the energy of all the intermediate data points of the third block has been compared and the third count has been updated accordingly, increasing the third temporary threshold by a stage gain value and setting a second temporary threshold equal to the third temporary threshold; and
while computing the n-2 stage and prior to computing the n-1 stage of the n stage FFT, wherein the n-2 stage produces a second block of intermediate data points from which the n-1 stage is computed:
incrementing a second count for each intermediate data point of the second block having an energy above the second temporary threshold;
decrementing the second count for each intermediate data point of the second block having an energy below the second temporary threshold;
if the second count reaches the positive limit, increasing the second temporary threshold by the step value and resetting the second count to zero;
if the second count reaches the negative limit, decreasing the second temporary threshold by the step value and resetting the second count to zero; and
after the energy of all the intermediate data points of the second block has been compared and the second count has been updated accordingly, increasing the second temporary threshold by the stage gain value and setting the temporary threshold equal to the second temporary threshold.

6. The method of claim 5, wherein the third temporary threshold is set based on the energy of the baseband digital samples.

7. The method of claim 6, wherein the stage gain value corresponds to the gain of the FFT for each stage.

8. The method of claim 1, wherein the block of baseband digital samples includes 1024 samples, the n stage FFT is a 10 stage FFT, the stage gain value corresponds to 3 dB, and the margin value corresponds to 12 dB.

9. The method of claim 1, wherein attenuating the output data points includes setting each output data point having an energy above the final threshold equal to zero.

10. The method of claim 1, wherein output data points having an energy below the final threshold are passed through without being attenuated.

11. The method of claim 1, repeating the computing n-1 stages, computing a final threshold, computing a final stage, and attenuating acts for successive blocks of baseband digital samples to produce a sequence of blocks of interference suppressed frequency domain samples, wherein the final threshold for each block of baseband digital samples is set based on the energy of that block of baseband digital samples.

12. A filter for suppressing narrowband interference in a radio frequency (RF) signal being received, the filter comprising:
one or more processing devices; and
one or more data storage devices including instructions which, when executed by the one or more processing devices, cause the one or more processing devices to:
provide a stream of baseband digital samples of the RF signal;
compute n-1 stages of an n stage fast Fourier transform (FFT) on a block of the baseband digital samples to produce a first block of intermediate data points, wherein n is an integer greater than 1;
compute a final threshold based on values of the intermediate data points;
compute a final stage of the n stage FFT from the first block of intermediate data points to produce a block of output data points; and
attenuate the output data points that have an energy above the final threshold.

13. The filter of claim 12, wherein compute a final threshold includes:
compare an energy of the intermediate data points to a temporary threshold;
set a final threshold based on how many of the intermediate data points have an energy above the temporary threshold and how many of the intermediate data points have an energy below the temporary threshold.

14. The filter of claim 13, wherein set the final threshold includes:
increase the temporary threshold based on more intermediate data points having an energy above the temporary threshold than below the temporary threshold; and
decrease the temporary threshold based on more intermediate data points having an energy below the temporary threshold than above the temporary threshold;
hold the temporary threshold based on a number of intermediate data points having an energy above the temporary threshold being about the same as a number of intermediate data points having an energy below the temporary threshold; and
after increasing, decreasing, or maintaining the temporary threshold, increase the temporary threshold by a margin value and set the final threshold equal to the temporary threshold.

15. The filter of claim 13, wherein set the final threshold includes:
while computing the n-1 stage and prior to computing the final stage of the n stage FFT:
increment a count for each intermediate data point of the first block having an energy above the temporary threshold;
decrement the count for each intermediate data point of the first block having an energy below the temporary threshold;
if the count reaches a positive limit, increase the temporary threshold by a step value and resetting the count to zero;
if the count reaches a negative limit, decrease the temporary threshold by the step value and resetting the count to zero; and
after the energy of all the intermediate data points of the first block has been compared and the count has been updated accordingly, increase the temporary threshold by a margin value and set the final threshold equal to the temporary threshold.

16. The filter of claim 15, wherein the instructions cause the one or more processing devices to:
while computing the n-3 stage and prior to computing the n-2 stage of the n stage FFT, wherein the n-3 stage produces a third block of intermediate data points from which the n-2 stage is computed:
increment a third count for each intermediate data point of the third block having an energy above a third temporary threshold;
decrement the third count for each intermediate data point of the third block having an energy below the third temporary threshold;
if the third count reaches the positive limit, increase the third temporary threshold by the step value and resetting the third count to zero;
if the third count reaches the negative limit, decrease the third temporary threshold by the step value and resetting the third count to zero; and
after the energy of all the intermediate data points of the third block has been compared and the third count has been updated accordingly, increase the third temporary threshold by a stage gain value and set a second temporary threshold equal to the third temporary threshold; and
while computing the n-2 stage and prior to computing the n-1 stage of the n stage FFT, wherein the n-2 stage produces a second block of intermediate data points from which the n-1 stage is computed:
increment a second count for each intermediate data point of the second block having an energy above the second temporary threshold;
decrement the second count for each intermediate data point of the second block having an energy below the second temporary threshold;
if the second count reaches the positive limit, increase the second temporary threshold by the step value and resetting the second count to zero;
if the second count reaches the negative limit, decrease the second temporary threshold by the step value and resetting the second count to zero; and
after the energy of all the intermediate data points of the second block has been compared and the second count has been updated accordingly, increase the second temporary threshold by the stage gain value and set the temporary threshold equal to the second temporary threshold.

17. The filter of claim 16, wherein the third temporary threshold is set based on the energy of the baseband digital samples, wherein the stage gain value corresponds to the gain of the FFT for each stage.

18. The filter of claim 12, wherein the instructions cause the one or more processing devices to repeat the compute n-1 stages, compute a final threshold, compute a final stage, and attenuate acts for successive blocks of baseband digital samples to produce a sequence of blocks of interference suppressed frequency domain data,
wherein the final threshold for each block of baseband digital samples is set based on the energy of that block of baseband digital samples.

19. The filter of claim 12, wherein the one or more processing devices include a field programmable gate array (FPGA), and wherein the instructions include configuration instructions for programming the FPGA into an appropriate configuration.

* * * * *